United States Patent [19]

Harris et al.

[11] Patent Number: 5,711,923
[45] Date of Patent: *Jan. 27, 1998

[54] HYDROXYMETHYL DIPHOSPHONATED POLYACRYLATES FOR RED MUD TREATMENT

[75] Inventors: Paul J. Harris, Orland Park; Robert P. Mahoney, Warrenville; Manian Ramesh, Lisle, all of Ill.

[73] Assignee: Nalco Chemical Company, Naperville, Ill.

[*] Notice: The term of this patent shall not extend beyond the expiration date of Pat. No. 5,534,235.

[21] Appl. No.: 675,135

[22] Filed: Jul. 3, 1996

Related U.S. Application Data

[63] Continuation-in-part of Ser. No. 523,993, Sep. 5, 1995, Pat. No. 5,534,235, which is a continuation-in-part of Ser. No. 217,906, Mar. 25, 1994, abandoned.
[51] Int. Cl.⁶ .................... C01F 7/00; B01D 21/00
[52] U.S. Cl. .................... 423/121; 210/732; 210/723
[58] Field of Search ................ 423/121; 210/732, 210/723

[56] References Cited

U.S. PATENT DOCUMENTS

| | | |
|---|---|---|
| 3,085,853 | 4/1963 | Lesinski et al. |
| 3,284,393 | 11/1966 | Vanderhoff et al. |
| 3,390,959 | 7/1968 | Sibert . |
| 3,397,953 | 8/1968 | Galvin et al. |
| 3,445,187 | 5/1969 | Sibert . |
| 3,541,009 | 11/1970 | Arendt et al. |
| 3,681,012 | 8/1972 | Sibert . |
| 4,207,405 | 6/1980 | Masler et al. |
| 4,678,585 | 7/1987 | Brownrigg ............... 210/727 |
| 4,678,840 | 7/1987 | Fong et al. ............... 525/340 |
| 4,767,540 | 8/1988 | Spitzer et al. |
| 5,008,089 | 4/1991 | Moody et al. |
| 5,217,620 | 6/1993 | Mahoney et al. |
| 5,478,477 | 12/1995 | Ramesh et al. ............ 423/121 |
| 5,534,235 | 7/1996 | Reed et al. ............... 423/121 |

Primary Examiner—Steven Bos
Attorney, Agent, or Firm—Robert A. Miller; Kelly L. Cummings; James J. Drake

[57] ABSTRACT

The invention comprises a process for improved flocculation of Bayer process red mud-containing slurry. The improvement comprises adding to the red mud-containing liquor a hydroxymethyl diphosphonic acid polymer optionally in addition to the conventional flocculant. The polymer is added to the red mud-containing liquor in an amount sufficient to reduce the concentration of suspended solids in the supernatant phase and/or increase the rate of sedimentation.

26 Claims, No Drawings

HYDROXYMETHYL DIPHOSPHONATED POLYACRYLATES FOR RED MUD TREATMENT

The present application is a continuation-in-part of Ser. No. 08/523,993 filed Sep. 5, 1995, now U.S. Pat. No. 5,534,23, by Peter E. Reed and Robert P. Mahoney entitled "Polymers Containing Phosphonic Acid Groups for the Treatment of Red Mud in the Bayer Process", now issued U.S. Pat. No. 5,534,235 which is a continuation-in-part of Ser. No. 08/217,906 filed Mar. 25, 1994, now abandoned, by Peter E. Reed and Robert P. Mahoney entitled "Polymers Containing Phosphonic Acid Groups for the Treatment of Red Mud in the Bayer Process", the disclosures of which are incorporated herein by reference.

FIELD OF THE INVENTION

The present invention is an improved method for clarification of red mud-containing slurries, particularly the slurry generated in the Bayer process for the recovery of alumina from bauxite ore.

BACKGROUND OF THE INVENTION

In the Bayer process for the production of alumina, bauxite ore is pulverized, slurred in water, and then digested with caustic at elevated temperatures and pressures. The caustic solution dissolves oxides of aluminum, forming an aqueous sodium aluminate solution. The caustic-insoluble constituents of bauxite ore (referred to as "red mud") are then separated from the aqueous phase containing the dissolved sodium aluminate. Solid alumina trihydrate product is precipitated out of the solution and collected as product.

In more detail, the pulverized bauxite ore is fed to a slurry mixer where a water slurry is prepared. The slurry makeup water is typically spent liquor (described below) and added caustic. This bauxite ore slurry is then diluted and passed through a digester or a series of digesters where alumina is released from the ore as caustic-soluble sodium aluminate. The digested slurry is then cooled to about 230° F., typically employing a series of flash tanks wherein heat and condensate are recovered. The aluminate liquor leaving the flashing operation contains from about 1 to about 20 weight percent suspended solids, which solids consist of the insoluble residue that remains after, or is precipitated during, digestion. The coarser solid particles may be removed from the aluminate liquor with a "sand trap" cyclone. The finer solid particles are generally separated from the liquor first by settling and then by filtration, if necessary. The slurry of aluminate liquor and the finer solids is normally first fed to the center well of a mud settler, or primary settler, where it is treated with a flocculant, and as the mud settles, clarified sodium aluminate solution, referred to as "green" or "pregnant" liquor, overflows a weir at the top. This overflow from the mud settling tank is passed to the subsequent process steps. If the aluminate liquor overflowing the settler contains an unacceptable concentration of suspended solids (at times from about 50 to about 500 mg of suspended solids per liter), it is then generally further clarified by filtration to give a filtrate with no more than about 10 mg suspended solids per liter of liquor. The treatment of the liquor collected after the primary settlement to remove any residual suspended solids before alumina trihydrate is recovered is referred to as a secondary clarification stage.

The clarified sodium aluminate liquor is seeded with alumina trihydrate crystals to induce precipitation of alumina in the form of alumina trihydrate, $Al(OH)_3$. The alumina trihydrate particles or crystals are then separated from the concentrated caustic liquor, and the remaining liquid phase, the spent liquor, is returned to the initial digestion step and employed as a digestant after reconstitution with caustic.

In another section of the Bayer circuit, the settled solids of the primary settler ("red mud") are withdrawn from the bottom of the settler and passed through a countercurrent washing circuit for recovery of sodium aluminate and soda. The countercurrent washing circuit utilizes two or more washers which receive a mud washer feed slurry from either the settler underflow or other washer under flow, as well as any dilution liquor. As noted above, the red mud does not include any coarser particles removed prior to feeding the slurry to the primary or mud settler.

The at least partial separation of the red mud solids from the pregnant liquor at elevated temperatures by settling or by filtration is expedited by the use of a flocculant. This initial clarification of the pregnant liquor into a clarified liquor phase is referred to as the primary settler stage. Flocculating agents improve the separation of insolubles by increasing the rate at which the solids settle, by reducing the amount of residual solids suspended in the liquor, and by decreasing the amount of liquor in the settled solids phase. Flocculation performance is highly important in the primary settlement stages. Red muds are comprised chiefly of iron oxides (at least about 50 weight percent of the red mud solids), together with silicon oxides, calcium oxides, sodium alumina-silicates, titanium oxides and other materials, and commonly represent from about 5 to about 50 percent of the dry weight of the bauxite ore. Generally these muds are comprised of very fine particles, which hinder the desired rapid and clean separation of red mud particles from the solubilized alumina liquor. If the rate of separation is slow, output is materially diminished and overall process efficiency is impaired. If the separation is not clean, the resultant aluminate liquor will require a more extensive treatment to remove residual solids, and/or the alumina trihydrate recovered will contain levels of impurities that are undesirably high for many end-uses.

The polysaccharides starch and dextran were used early in red mud flocculation. For instance, U.S. Pat. No. 3,085,853, Apr. 16, 1963, Lesinski et al., uses native dextrans to increase the rate of sedimentation of finely divided solids in aqueous suspensions and thereby facilitate the separation of such solids. Later synthetic polymeric flocculants became more commonly employed for the Bayer process. U.S. Pat. No. 3,390,959 issued Jul. 2, 1968 to Sibert, uses acrylate homopolymers and copolymers which contain not more than 20% of other ethylenically unsaturated polymerizable polar monomers for the Bayer process. Included in Sibert's polar comonomers are acrylamide and diethylvinylphosphonate, among others. Diethylvinylphosphonate is the diethyl ester of vinylphosphoric acid, and can be hydrolyzed to the monoethyl ester in caustic solution. Complete hydrolysis of diethylvinylphosphonate groups to dibasic vinylphosphonic acid salt groups is not observed in caustic solution under Bayer process conditions, so the polymers of Sibert are neither converted to in use nor are equivalent to the hydroxymethyl diphosphonic acid polymers of the present invention.

U.S. Pat. No. 3,397,953, Aug. 20, 1968, Galvin et al., uses a blend of starch and polyacrylic acid on red mud suspensions, noting that polyacrylic acid alone is not suitable as a flocculating agent. The polyacrylic acids exemplified generally have molecular weights of less than 300,000. The flocculation and sedimentation activity of the blend is exemplified in the primary settler stage of a bauxite process. U.S. Pat. No. 3,445,187, May 20, 1969, Sibert, uses synthetic acrylic acid polymer alone to enhance the rate of separation of red mud solids from the aqueous caustic solutions during secondary clarification steps. The synthetic polymer used contains at least about 80 weight percent of the acrylic acid mer unit, and has a molecular weight in excess of 50,000, and preferably in excess of 100,000. U.S. Pat. No. 3,541,009, Nov. 17, 1970, Arendt et al., uses a combination of causticized or modified starch, a water soluble polymer, and a caustic alkali to enhance the coagulation, sedimentation and/or filtration of aqueous suspensions of solids, including the settling of red mud from Bayer process liquor. The water soluble polymer is derived from at least one olefinically-unsaturated monomer and has a molecular weight in excess of 100,000.

U.S. Pat. No. 3,681,012, Aug. 1, 1972, Sibert, uses an acrylic acid polymer most preferably having a molecular weight of at least, 1,000,000, either alone or in combination with starch, for clarification of digested bauxite containing solubilized alumina and red mud residues. U.S. Pat. No. 4,767,540, Aug. 30, 1988, Spitzer et at., uses a polymer that contains hydroxamic acid groups for the same purpose. U.S. Pat. No. 5,008,089, Apr. 16, 1991, Moody et at., uses a combination of dextran and synthetic artionic polymer for flocculating red mud in Bayer process liquors.

U.S. Pat. No. 5,217,620, Jun. 8, 1993, Mahoney et at., uses a combination of pullulan, lactan, rhamsan, or zooglan with a conventional water soluble anionic flocculant for red mud settling.

The synthetic flocculating agents employed for the settling or filtration of red mud are generally water soluble polymers of one or more ethylenically-unsaturated monomers, and have been used together, as noted above, with starch and dextran for aluminate liquor clarification. The synthetic flocculating agents are usually anionic, and the optimum anionic content of such polymer is usually related to the alkalinity of the liquor. In the washing circuit, the early wash liquors have the highest alkalinity and may require a more highly anionic polymer than the later wash liquors.

It is an object of the present invention to provide a more effective flocculation for separating red mud from the red mud-containing liquors, particularly the primary settler liquor, of the Bayer process. It is an object of the present invention to provide an improved method whereby the suspended solids retained in the supernatant phase after flocculation of the red mud-containing liquors, particularly the primary settler liquor, of the Bayer process are diminished. It is an object of the present invention to provide a more effective Bayer process wherein flocculation for separating red mud from the red mud-containing liquors, particularly the primary settler liquor, is improved by a more complete flocculation of the solids. Such red mud-containing liquors include the liquors of the counter-current mud washers.

SUMMARY OF THE INVENTION

The invention comprises a process for improved flocculation of Bayer process red mud-containing liquor. The improvement comprises adding to the red mud-containing liquor a water-soluble hydroxymethyl diphosphonated polymer by itself or in combination with a conventional flocculant. The polymer is added to the red mud-containing liquor in an amount sufficient to increase the rate of sedimentation and/or reduce the concentration of suspended solids in the supernatant phase.

DESCRIPTION OF THE INVENTION

The invention comprises a process for improved flocculation of Bayer process red mud-containing liquor. The conventional flocculation process to which the invention is an improvement comprises using a water-soluble flocculant to form a red mud phase and a supernatant phase from the red mud-containing liquor. The supernatant contains residual suspended solids. These flocculants are primarily derived from carboxylic and are comprised of from about 0 to about 30 mole percent of nonionic units and from about 70 to about 100 mole percent of anionic units and have a weight average molecular weight of at least 500,000.

The red mud-containing slurry that is preferably treated by the process is characterized as having a total alkalinity of from about 10 to 300 grams per liter expressed as sodium carbonate. Further, the slurry is characterized as having from about 10 grams per liter to about 350 grams per liter insoluble solids content. The separation of the red mud is conducted at atmospheric pressure and at a temperature from about 30° C. to about 115° C. Preferably, the treated slurry is a primary settler feed slurry in the Bayer process. The red mud-containing slurry is further characterized as containing dissolved sodium aluminate.

The invention is a process for treating Bayer process red mud-containing liquor comprising the steps of:

a) adding to the red mud-containing liquor a water-soluble hydroxymethyl diphosphonated polymer of the formula

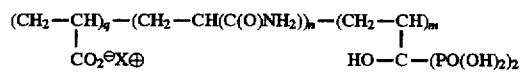

wherein n is an integer from 1 to 100, m is an integer from 1 to 100, q is an integer from 1 to 100 and X is selected from the group consisting of sodium, potassium, and ammonium;

b) allowing separation of the treated red mud-containing liquor into a red mud phase and a clarified liquor phase whereby the polymer is added in an amount sufficient to form a red mud phase having a concentration of solids that is at least about 150% of the initial concentration of solids in the red mud-containing liquor; and c) recovering the clarified liquor phase.

The above process may also be modified wherein suspended solids are concentrated by sedimentation. The total alkalinity of the red mud-containing liquor may be from about 10 to 300 grams per liter, expressed as sodium carbonate. The solids content of the red mud-containing liquor may be from about 10 grams per liter to about 350 grams per liter. The treatment of the red mud-containing liquor is conducted at atmospheric pressure and at a temperature of from 30° C. to about 115° C. The red mud-containing liquor may be a primary settler feed. Additionally, the red mud-containing liquor is a mud washer feed slurry. The process can be further modified by the addition of flocculant to the red mud-containing liquor.

The invention is also a Bayer process wherein bauxite ore is digested in an aqueous alkaline medium wherein alumina present in the bauxite ore is solubilized in the aqueous medium providing a red mud-containing liquor containing dissolved sodium aluminate and red mud solids and the red mud-containing liquor is treated to separate the mud solids from the liquor, wherein the process is improved by:

adding to the red mud-containing liquor a water-soluble hydroxymethyl diphosphonated polymer of the formula

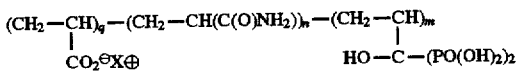

wherein n is an integer from 1 to 100, m is an integer from 1 to 100, q is an integer from 1 to 100 and X is selected from the group consisting of sodium, potassium, and ammonium in an amount of from about 0.5 to about 50 milligrams per liter of red mud-containing liquor. The polymer may be added to the red mud-containing liquor in an amount of from about 0.001 to about 0.1 weight percent of polymer based on the weight of red mud solids in the red mud-containing liquor. The total alkalinity of the red mud-containing liquor may be from about 10 to 300 grams per liter, expressed as sodium carbonate;

the solids content of the red mud-containing fed slurry may be from about 25 grams per liter to about 350 grams per liter; and the treatment of the red mud-containing liquor may be conducted at atmospheric pressure and at a temperature of from about 30° C. to about 115° C. The red mud-containing liquor may be a primary settler feed. Furthermore, the process may also include addition of a flocculant to the red mud-containing liquor.

The invention is also a process for treating Bayer process red mud-containing liquor comprising the steps of:

a) adding to the red mud-containing liquor a water-soluble hydroxymethyl diphosphonated polymer of the formula

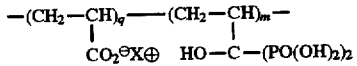

wherein m is an integer from 1 to 100, q is an integer from 1 to 100 and X is selected from the group consisting of sodium, potassium, and ammonium;

b) allowing separation of the treated red mud-containing liquor into a red mud phase and a clad fled liquor phase whereby the polymer being added in an mount sufficient to form a red mud phase having a concentration of solids that is at least about 150% of the initial concentration of solids in the red mud-containing liquor; and c) recovering the clad fled liquor phase. The suspended solids may be concentrated by sedimentation. The total alkalinity of the red mud-containing liquor may be from about 10 to 300 grams per liter, expressed as sodium carbonate. The solids content of the red mud-containing liquor may be from about 10 grams per liter to about 350 grams per liter. The treatment of the red mud-containing liquor may be conducted at atmospheric pressure and at a temperature of from 30° C. to about 115° C. The red mud-containing liquor may be a primary settler feed. Moreover, the red mud-containing liquor may be a mud washer feed slurry. The process may be further modified by the addition of a flocculant to the red mud-containing liquor.

The invention is also a Bayer process wherein bauxite ore is digested in an aqueous alkaline medium wherein alumina present in the bauxite ore is solubilized in the aqueous medium providing a red mud-containing liquor containing dissolved sodium aluminate and red mud solids and the red mud-containing liquor is treated to separate the mud solids from the liquor, wherein the process is improved by:

adding to the red mud-containing liquor a water-soluble hydroxymethyl diphosphonated polymer of the formula

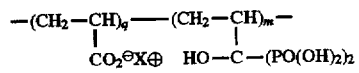

wherein m is an integer from 1 to 100, q is an integer from 1 to 100 and X is selected from the group consisting of sodium, potassium, and ammonium in an amount of from about 0.5 to about 50 milligrams per liter of red mud-containing liquor.

The polymer may be added to the red mud-containing liquor in an amount of from about 0.001 to about 0.1 weight percent of polymer based on the weight of red mud solids in the red mud-containing liquor. The total alkalinity of the red mud-containing liquor may be from about 10 to 300 grams per liter, expressed as sodium carbonate; the solids content of the red mud-containing fed slurry may be from about 25 grams per liter to about 350 grams per liter; and the treatment of the red mud-containing liquor may be conducted at atmospheric pressure and at a temperature of from about 30° C. to about 115° C. The red mud-containing liquor may be a primary settler feed. The process may further be modified by the addition of a flocculant to the red mud-containing liquor.

Preferably, the polymer is added to the liquor in an amount of from about 0.5 to about 200 milligrams of polymer actives per liter of mud. Further, the anionic polymer is preferably added in an amount of from about 0.001 to about 0.1 weight percent of polymer actives based on the weight of red mud solids in the slurry.

The method by which the red mud containing liquors of the Bayer process are clarified is comprised of using a hydroxymethyl diphosphonated polymer as a flocculant or coflocculant in the clarification process described above. The use of simple alkyl phosphoric acids as collectors in mineral processing is well known, particularly for the flotation of cassiterite. We have found that hydroxymethyl diphosphonated polymers provide unexpected benefits in terms of reducing the amount of suspended solids in the overflow liquor when used to clarify Bayer process liquor. The term hydroxymethyl diphosphonic acid, when used herein, is intended to encompass the hydroxymethyl diphosphonic acid salts produced when the diphosphonic acid is dissolved in an aqueous media possessing a moderately low to a high pH. Furthermore, it is recognized that the hydroxymethyl diphosphonic acids of the present invention will be present in the corresponding anionic salt form in the Bayer process liquor.

Flocculants which can be used in conjunction with the hydroxymethyl diphosphonated polymers of this invention include natural compounds such as starch, dextran, pullulan and alginic acid and synthetic flocculants such as poly (sodium acrylate) poly(acrylamide/acrylic acid) and poly (ammonium acrylate). The flocculant may be added to the process liquor simultaneously to the addition of the clarifying hydroxymethyl diphosphonated polymers of this invention, or subsequently to the addition of clarifier or alternatively prior to the addition of clarifier to aid the separation of the process liquor into distinct phases. The flocculant may be added to the liquor in an amount of from about 0.5 to about 50 milligrams of flocculant per liter of mud. Preferably, the flocculant may be added to the process liquor in an amount of from about 1 to about 15 milligrams of flocculant per liter of mud.

Hydroxymethyl diphosphonic acids of the present invention can be prepared by reacting acrylamide/acrylic acid copolymers. These copolymers can be prepared by free radical methods which are well known to those skilled in the art, including solution polymerization, inverse emulsion polymerization, and inverse microsuspension polymerization. Latex poly(acrylic acid) homopolymers and copolymers, prepared by inverse emulsion or inverse microsuspension polymerization, have found widespread use in the clarification of Bayer process liquors. These products typically contain, on a weight percent basis, about one third polymer, about one third water and dissolved salts, and about one third hydrocarbon oil and dissolved surfactants.

The reaction product of PC13 and a water soluble carboxyl-containing low molecular weight polymer is disclosed in U.S. Pat. No. 4,207,405. A preferred polymer for such modification is poly(acrylic acid) having molecular weight of 6,000.

Acrylamide polymers, as the term is used herein, includes polymers consisting entirely of acrylamide units, which may be partially hydrolyzed to acrylic acid units. The term acrylic acid units encompasses the various salts such as the sodium, potassium or ammonium salt form of the acrylic acid. This hydrolysis of amide groups to carboxylic acid groups may be conducted using alkaline materials such as sodium hydroxide, ammonium hydroxide, soda ash, potassium hydroxide, or quaternary ammonium hydroxide.

Polyacrylamide may be synthesized as one of three forms: solid, solution or emulsion. Dry polymer may be obtained by solution polymerization with a high concentration of monomer. The resultant gel can be ground and dried to obtain polyacrylamide in a powdered form. Solution polymerization with up to 15% monomer results in an aqueous solution of polyacrylamide. Lastly, polyacrylamide can be made in the form of an aqueous water-in-oil emulsion. The emulsion is formed by utilizing a water-in-oil emulsifying agent. To this monomer is added a free radical-type polymerization catalyst and then heat is applied under free radical-forming conditions to form water-soluble polymer lattices. The polymer lattices may be unstable, and therefore must be treated with additional emulsifiers. The preparation of these emulsions is described in U.S. Pat. No. 3,284,393. Subsequently, the emulsions may be inverted to produce aqueous solutions.

Preferably, the hydroxymethyl diphosphonic acid moiety is introduced by means of a post-polymerization modification with phosphorus trichloride. As used herein, the term "hydroxymethyl diphosphonated polymer" refers to a polymer whose free carboxyl groups have been reacted to a certain extent with $PCl_3$ to form a —$C(OH)(PO(OH_2)_2$ unit. As incorporation increases, the efficiency of the polymer for clarification purposes also increases. Incorporation may range from 1 to 80%, preferably 5–50% and most preferably from 10 to 30%.

The anionic treatment polymers useful in the practicing of this invention may be homopolymers of acrylic acid, methacrylic acid or maleic anhydride and copolymers containing acrylic acid, or methacrylic acid, which copolymers also contain at least one of the monomers chosen from the group consisting of acrylamide, methacrylamide, maleic anhydride, hydroxypropylacrylates, hydroxyethylacrylates, N-tertiary butyl acrylamide, 2-acrylamido-2-methylpropane sulfonate, sulfomethyl acrylamide, sulfomethyl methacrylamide, sulfoethylacrylamide, sulfonated styrene, vinyl sulfonate, itaconic acid, or N-hydroxypropylacrylamide. Non-ionic water soluble polymers such as homopolymers of acrylamide or co-polymers of acrylamide and other suitable monomers can also be used. Water soluble co-polymers of acrylamide and acrylic acid with from 5 to 100% by weight acrylic acid are presently preferred.

The examples provided above are for illustrative purposes only and are not intended to be all-inclusive. Within the scope of this invention, any water soluble, hydroxymethyl diphosphonated polymer may be used to clarify Bayer process liquor. The optimum amount of hydroxymethyl diphosphonic acid groups present on the polymer will depend on several factors such as cost and performance, and will range from about 1 mole percent to 100 mole percent, with a preferred range of 1 to 30 mole percent. In a preferred form, the polymer will posses, in addition to hydroxymethyl diphosphonic acid groups, high molecular weight and improved chelation high anionic charge density. The useful polymer molecular weights range from about $1 \times 10^4$ to about $3 \times 10^7$ g/M. It is usually preferable to use as high of a molecular weight as possible for a given polymer, assuming that the polymer backbone is linear and not highly crosslinked. It is advantageous, particularly in the settler, to use a hydroxymethyl diphosphonic acid polymer possessing a high avionic charge density. This can often be achieved by the incorporating the hydroxymethyl diphosphonic acid groups into a sulfonic or carboxylic acid containing polymer.

The following examples are presented to describe preferred embodiments and utilities of the invention and are not meant to limit the invention tinless otherwise stated in the claims appended hereto.

EXAMPLE 1

20 grams of acrylic acid (available from Aldrich Chemical Co.) was mixed with 78.20 grams of sulfolane. To the mixture was added 0.02 grams of Vazo 52 (initiator available from DuPont) in THF and 0.16 grams of Vazo 64 (initiator available from DuPont) in THF. The mixture was heated to 68° C. and held for 2 hours. 85 grams of the resultant polymer solution was reacted with $PCl_3$ (available from Aldrich Chemical Co.) by the following procedure. The solution in a flask was protected from water vapor by the outlet attached to a tube filled with Drierite. The flask was placed in a 50° C. water bath and while the solution was mixed, 6.47 grams of $PCl_3$ was added. The mixture became viscous and 43.5 grams of sulfolane was added to decrease viscosity. The mixture was slowly heated to 120° C. (at 80° C. the water bath was replaced with a heating mantle, then held at 120° to 130° C. for 3 hours. Next, the mixture was cooled to 70° C. and 20 grams of water were added. 20 grams of 50% sodium hydroxide were then added, and held at 80° C. for 1 hour. The mixture was cooled, and two phases were obtained; a liquid phase and a polymer gel. It is estimated that the 167.10 grams of gel contained 10.0% calculated as poly(acrylic acid) (polymer actually derivative but based equivalents as poly(acrylic acid). 9.8 grams of this gel were used with 2.0 grams of 50% of NaOH to prepare a 0.5% polymer solution based (% based on polymer as poly(acrylic acid). The polymer had an RSV of 2.64 as measured in 1M sodium nitrate for a 0.045% actives polymer solution. NMR characterization of the product using P 31 NMR showed 18 mole % diphosphonic acid incorporation.

EXAMPLE 2

4.0 grams of a dry 70/30 acrylic acid/sodium acrylate copolymer (P, SV 36 dL/g, measured in 1M sodium nitrate for a 0.045% actives polymer solution) was dispersed in 100 grams of toluene in a flask protected from moisture. The dispersion was heated to 40° C. To this was added 1.25 grams of $PCl_3$. After $PCl_3$ addition, the mixture was heated to reflux (flask at 110° C.) and held for 4 hours. Then the mixture was cooled to 25°, and 14.9 grams of water followed by 2.13 grams of 50% sodium hydroxide were added. After heating to 80° C. for 1 hour, 2.9 grams of 50% NaOH were added and a constant temperature was maintained for 1.0 hour. Then, the reaction mixture was cooled. 25.52 grams of polymer gel was obtained as a separate phase. This polymer had an RSV of 13.5 measured in 1M sodium nitrate for a 0.045% actives polymer solution. NMR characterization of the product using P 31 NMR showed 13 mole % diphosphonic acid composition.

EXAMPLE 3

20 grams of acrylic acid was mixed with 78.20 grams of sulfolane. To the mixture was added 0.02 grams of Vazo 52 in THF and 0.16 grams of Vazo 64 in THF. The mixture was heated to 68° C. and held for 2 hours. 85 grams of the resultant polymer solution was reacted with $PCl_3$ by the following procedure. The solution in a flask was protected from water vapor by the outlet attached to a tube filled with Drierite. The flask was placed in a 50° C. propylene glycol for more complete heating of flask than the heating mantle as utilized in Example 1. While the solution was mixed, 15.25 grams of $PCl_3$ was added. The mixture became viscous and 50.56 grams of sulfolane was added to decrease viscosity. The mixture was slowly heated to between 120° and 140° C. The temperature was then held at 120° to 130° C. for 3.5 hours. The mixture was then cooled to 70° C. and 100 grams of water were added; followed by 46 grams of 50% NaOH and 50 grams of water. Next, the mixture was heated to 80° C. and held at 80° C. for 2 hours, then subsequently cooled. Polymer gel separated out. 2% polymer solutions were made up in DI water for testing purposes. This polymer had an RSV of 2.6 measured in 1M sodium nitrate for a 0.045% actives polymer solution. NMR characterization of the product using P31 NMR showed a 6 mole % diphosphonic acid composition.

EXAMPLE 4

In a reactor fitted with a mechanical stirrer, addition funnel, and a thermocouple was placed 255 g sulfolane. The reactor was heated to 50° C. to melt sulfolane. To this reactor was added 28.13 g of poly(acrylic acid) with a molecular weight of 4 million followed by 10 mL of distilled water. The reaction mixture was stirred well for 15 minutes at 35°–40° C. to give a pasty suspension. Thirty two mL of phosphorous trichloride ($PCl_3$) was added dropwise into the reaction mixture using the addition funnel. An exothermic reaction was noticed. Then, the temperature raised from 37° to 46° C. The reaction mixture was then heated to 100°–110° C., and held at that temperature for 5.5 hours. The reactor was then cooled to room temperature. The reaction mixture next turned into a turbid solution. Five mL of water was added to destroy any unreacted $PCl_3$. Subsequently, 100 mL of water, and 100 g of 50% aqueous sodium hydroxide solution were added into the reaction mixture. It was then heated at 100° C. for 3 hours and then cooled to room temperature. Sulfolane was removed from the reaction mixture by extraction with chloroform. The product obtained was characterized by P31 NMR and found to contain 30 mole % 1,1-diphosphonic acid moieties.

EXAMPLE 5

The general procedure employed is a laboratory test that determines the performance of polymers as follows:

1. One-liter size test samples of a 90° to 100° C. settler feed are obtained from a sample of settler feed. (Such settler feeds were obtained from various bauxite refineries.) To assure that the contents of each test sample are uniform, the settler feed is ladled from a bucket into one-liter graduated cylinders as follows. The settler feed is stirred before each portion taken and the remainders from each scoop being returned to the bucket; the graduated cylinders are first filled only halfway; and then the graduated cylinders are filled to the one-liter mark in a reverse order. The graduated cylinders are then stoppered and placed in a 95° to 100° C. water bath or oven, and held therein until the testing begins. For washer slurry tests, washer feed is used and it is maintained at the temperature of that washer.

2. A cylinder is removed from the water bath or oven, and the contents thereof are adjusted in temperature to 95°±1° C. in a 2-liter stainless steel bucket, and returned to the cylinder.

3. The cylinder contents are mixed by plunging two times with a perforated stainless steel disk or rubber stopper attached to the end of a stainless steel rod, which plunger is also used for the mixing in subsequent steps.

4. An aqueous solution of polymer is added by syringing the appropriate volumetric dose into the test sample and is then admixed therein by plunging four times. In examples with two or more polymers added, the first polymer solution is added and plunged two times then the second polymer solution is added and plunged two times. The comparative flocculant used for the tests of all the present examples was a sodium acrylate polymer of within the molecular weight range of from about 1,000,000 to about 20,000,000, although the substitution of other ionic flocculants in these the tests would be expected to provide the same relative results. The sodium acrylate polymer is a standard treatment.

5. A mud-clear liquor/mud interface forms in the cylinder. The time required for this interface to settle from the 900 ml mark down to the 700 ml of the graduated cylinder is recorded together with the time of day.

6. When the interface reaches the 700 ml mark, the cylinder is stoppered and returned to the water bath or oven, and held therein at 95° to 100° C. for a specific time period, described below. The level of the mud bed (the lower phase defined by the interface) is recorded (in ml) and the supernate is sampled by syringing 10 to 100 ml of liquor from a given depth in the cylinder.

7. The time period is the time elapsed from the time recorded in step 5 above (at which time the interface reaches the 700 ml mark) to the supernate sampling of step 6 above. This period may be between 15 and 60 minutes, provided it is the same for all cylinders in a test series. The depth from which the supernate is taken may be between 1 and 4 inches, provided such depth is the same for all cylinders in a test series.

8. The amount of suspended solids in the supernate sample taken from each cylinder is determined by standard optical turbidity measurement techniques and is the primary measure of clarification aid performance. In the absence of treating agents, turbidity of settler feeds is greater than 1000 NTU.

The amount of polymer added in Step 4 is noted in the specific examples in terms of mg of flocculant actives per liter of settler feed.

The results of the test are enumerated in Table I. If flocculant alone was utilized, turbidity in the range of 465–615 NTU was obtained. Combinations of flocculant and clarifier also reduced turbidity. However, the greatest turbidity reduction was obtained by use of the clarifier polymers of the instant invention.

TABLE I

| Polymer | Polymer Type | RSV (dL/g) | Clarifier Dose (mg/L) | Flocculant Dose (mg/L) | Settling Rate (ft/hr) | Turbidity NTU |
|---|---|---|---|---|---|---|
| Poly(Sodium Acrylate)[1] | Flocculant | 30 | 0 | 6 | 13 | 465 |
| Poly(Sodium Acrylate)[1] | Flocculant | 30 | 0 | 8 | 54 | 615 |
| Poly(Sodium Acrylate)[1] | Flocculant | 30 | 0 | 7 | 28 | 586 |
| Example 1 | Clarifier | 3.5 | 60 | 0 | 4.8 | 29 |
| Example 2 | Clarifier | 13.5 | 80 | 0 | 5.4 | 93 |
| Example 4 + | Clarifier | 2.7 | 30 | 0 | 17 | 369 |
| Poly(Sodium Acrylate)[1] | Flocculant | 30 | 0 | 7 | | |
| Example 4 + | Clarifier | 2.7 | 10 | 0 | 38 | 308 |
| Poly(Sodium Acrylate)[1] | Flocculant | 30 | 0 | 7 | | |
| Example 4 + | Clarifier | 2.7 | 7 | 0 | 28 | 509 |
| Poly(Sodium Acrylate)[1] | Flocculant | 30 | 0 | 10 | | |
| Example 1 + | Clarifier | 3.5 | 20 | 0 | 8.1 | 182 |
| Poly(Sodium Acrylate)[1] | Flocculant | 30 | 0 | 7 | | |
| Example 1 + | Clarifier | 3.5 | 30 | 0 | 17 | 369 |
| Poly(Sodium Acrylate)[1] | Flocculant | 30 | 0 | 7 | | |
| Example 1 + | Clarifier | 3.5 | 7 | 0 | 24 | 500 |
| Poly(Sodium Acrylate)[1] | Flocculant | 30 | 0 | 10 | | |

[1] = polymer available from Nalco Chemical Company

EXAMPLE 6

The experimental procedure described in Example 5 was utilized to obtain the results enumerated in Table II. Greatest turbidity reduction was obtained with a hydroxymethyl diphosphonated polymer.

TABLE II

| Polymer | Polymer Type | RSV (dL/g) | Clarifier Dose (mg/L) | Flocculant Dose (mg/L) | Settling Rate (ft/hr) | Overflow Solids (mg/L) |
|---|---|---|---|---|---|---|
| Poly(Sodium Acrylate)[2] | Flocculant | 30 | 0 | 10 | 41 | 162 |
| Poly(Sodium Acrylate)[2] | Flocculant | 30 | 0 | 8 | 12 | 162 |
| Example 1 | Clarifier | 3 | 125 | 0 | 5 | 25 |
| Example 1 + | Clarifier | 3 | 50 | | 7.7 | 62 |
| Poly(Sodium Acrylate)[2] | Flocculant | 30 | | 3 | | |
| Example 1 + | Clarifier | 3 | 50 | | 37 | 142 |
| Poly(Sodium Acrylate)[2] | Flocculant | 30 | | 9 | | |
| Acrylic acid-coVPA[1] (80/20 mole ratio) | Clarifier | 7 | 100 | 0 | 32 | 138 |
| Acrylic acid-coVPA[1] (80/20 mole ratio) | Clarifier | 7 | 30 | 0 | 77 | 96 |
| Acrylic acid-coVPA[1] (80/20 mole ratio) | Clarifier | 7 | 15 | 0 | 44 | 102 |
| Acrylic acid-coVPA[1] (80/20 mole ratio) | Clarifier | 7 | 10 | 0 | 25 | 104 |
| Acrylic acid-coVPA[1] (70/30 mole ratio) | Clarifier | 8.4 | 30 | 0 | 19 | 63 |
| Acrylic acid-coVPA[1] (70/30 mole ratio) | Clarifier | 8.4 | 40 | 0 | 28 | 65 |

[1]VPA = vinyl phosphonic acid
[2] = polymer commercially available from Nalco Chemical Company

EXAMPLE 7

The experimental procedure described in Example 5 was utilized to obtain the results enumerated in Table III. Here again, superior turbidity reduction was obtained with a hydroxymethyl diphosphonated polymer.

TABLE III

| Polymer | Polymer Type | RSV (dL/g) | Clarifier Dose (mg/L) | Flocculant Dose (mg/L) | Settling Rate (ft/hr) | Turbidity NTU |
|---|---|---|---|---|---|---|
| Poly(Sodium Acrylate)¹ | Flocculant | 30 | 0 | 8 | 54 | 615 |
| Poly(Sodium Acrylate)¹ | Flocculant | 30 | 0 | 6 | 13 | 465 |
| Example 1 | Clarifier | 3 | 30 + 30 | 0 | 4.8 | 29 |
| Example 1 + | Clarifier | 3 | 20 |  | 8.1 | 182 |
| Poly(Sodium Acrylate)¹ | Flocculant | 30 |  | 7 |  |  |
| Example 1 + | Clarifier | 3 | 40 |  | 46.6 | 93 |
| Poly(Sodium Acrylate)¹ | Flocculant | 30 |  | 8 |  |  |
| Acrylic acid-co-VPA (80:20 mole ratio) | Clarifier | 7 | 100 | 0 | 32 | 138 |
| Acrylic acid-co-VPA (80:20 mole ratio) | Clarifier | 7 | 160 | 0 | 18 | 70 |
| + Acrylic acid-coVPA (80:20 mole ratio) + | Clarifier | 7 | 68 |  | 42.3 | 157 |
| Poly(Sodium Acrylate) | Flocculant | 30 |  | 2 |  |  |

¹ = VPA = vinyl phosphonic acid
² = polymer available from Nalco Chemical Company Changes can be made in the composition, operation and arrangement of the method of the present invention described herein without departing from the concept and scope of the invention as defined in the following claims:

We claim:

1. A process for treating Bayer process red mud-containing liquor comprising the steps of:

a) adding to the red mud-containing liquor a water-soluble hydroxymethyl diphosphonated polymer of the formula

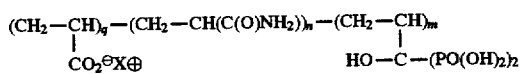

wherein n is an integer from 1 to 100, m is an integer from 1 to 100, q is an integer from 1 to 100 and X is selected from the group consisting of sodium, potassium, and ammonium;

b) separating the treated red mud-containing liquor into a red mud phase and a clarified liquor phase wherein the polymer is added in an amount sufficient to form a red mud phase having a concentration of solids that is at least about 150% of the initial concentration of solids in the red mud-containing liquor; and c) recovering the clarified liquor phase.

2. The process of claim 1 wherein suspended solids are concentrated by sedimentation.

3. The process of claim 1 wherein the total alkalinity of the red mud-containing liquor is from about 10 to 300 grams per liter, expressed as sodium carbonate.

4. The process of claim 1 wherein the solids content of the red mud-containing liquor is from about 10 grams per liter to about 350 grams per liter.

5. The process of claim 1 wherein the treatment of the red mud-containing liquor is conducted at atmospheric pressure and at a temperature of from 30° C. to about 115° C.

6. The process of claim 1 wherein the red mud-containing liquor is a primary settler feed.

7. The process of claim 1 wherein the red mud-containing liquor is a mud washer feed slurry.

8. The process of claim 1 further comprising adding a flocculant to the red mud-containing liquor.

9. In a Bayer process wherein bauxite ore is digested in an aqueous alkaline medium wherein alumina present in the bauxite ore is solubilized in the aqueous medium providing a red mud-containing liquor containing dissolved sodium aluminate and red mud solids and the red mud-containing liquor is treated to separate the mud solids from the liquor, wherein the process is improved by: adding to the red mud-containing liquor a water-soluble hydroxymethyl diphosphonated polymer of the formula

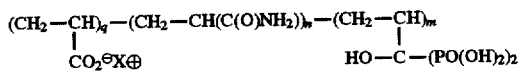

wherein n is an integer from 1 to 100, m is an integer from 1 to 100, q is an integer from 1 to 100 and X is selected from the group consisting of sodium, potassium, and ammonium in an amount of from about 0.5 to about 50 milligrams per liter of red mud-containing liquor.

10. The process of claim 9 wherein the polymer is added to the red mud-containing liquor in an amount of from about 0.001 to about 0.1 weight percent of polymer based on the weight of red mud solids in the red mud-containing liquor.

11. The process of claim 9 wherein the total alkalinity of the red mud-containing liquor is from about 10 to 300 grams per liter, expressed as sodium carbonate; the solids content of the red mud-containing fed slurry is from about 25 grams per liter to about 350 grams per liter; and the treatment of the red mud-containing liquor is conducted at atmospheric pressure and at a temperature of from about 30° C. to about 115° C.

12. The process of claim 9 wherein the red mud-containing liquor is a primary settler feed.

13. The process of claim 9 further comprising adding a flocculant to the red mud-containing liquor.

14. A process for treating Bayer process red mud-containing liquor comprising the steps of:

a) adding to the red mud-containing liquor a water-soluble hydroxymethyl diphosphonated polymer of the formula

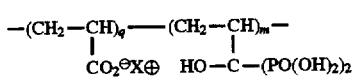

wherein m is an integer from 1 to 100, q is an integer from 1 to 100 and X is selected from the group consisting of sodium, potassium, and ammonium;

b) separating the treated red mud-containing liquor into a red mud phase and a clarified liquor phase wherein the polymer is added in an amount sufficient to form a red mud phase having a concentration of solids that is at least about 150% of the initial concentration of solids in the red mud-containing liquor; and c) recovering the clarified liquor phase.

15. The process of claim 14 wherein suspended solids are concentrated by sedimentation.

16. The process of claim 14 wherein the total alkalinity of the red mud-containing liquor is from about 10 to 300 grams per liter, expressed as sodium carbonate.

17. The process of claim 14 wherein the solids content of the red mud-containing liquor is from about 10 grams per liter to about 350 grams per liter.

18. The process of claim 14 wherein the treatment of the red mud-containing liquor is conducted at atmospheric pressure and at a temperature of from 30° C. to about 115° C.

19. The process of claim 14 wherein the red mud-containing liquor is a primary settler feed.

20. The process of claim 14 wherein the red mud-containing liquor is a mud washer feed slurry.

21. The process of claim 14 further comprising adding a flocculant to the red mud-containing liquor.

22. In a Bayer process wherein bauxite ore is digested in an aqueous alkaline medium wherein alma present in the bauxite ore is solubilized in the aqueous medium providing a red mud-containing liquor containing dissolved sodium aluminate and red mud solids and the red mud-containing liquor is treated to separate the mud solids from the liquor, wherein the process is improved by:

adding to the red mud-containing liquor a water-soluble hydroxymethyl diphosphonated polymer of the formula

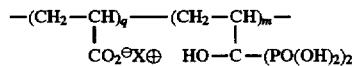

wherein m is an integer from 1 to 100, q is an integer from 1 to 100 and X is selected from the group consisting of sodium, potassium, and ammonium in an amount of from about 0.5 to about 50 milligrams per liter of red mud-containing liquor.

23. The process of claim 22 wherein the polymer is added to the red mud-containing liquor in an amount of from about 0.001 to about 0.1 weight percent of polymer based on the weight of red mud solids in the red mud-containing liquor.

24. The process of claim 22 wherein the total alkalinity of the red mud-containing liquor is from about 10 to 300 grams per liter, expressed as sodium carbonate; the solids content of the red mud-containing fed slurry is from about 25 grams per liter to about 350 grams per liter; and the treatment of the red mud-containing liquor is conducted at atmospheric pressure and at a temperature of from about 30° C. to about 115° C.

25. The process of claim 22 wherein the red mud-containing liquor is a primary settler feed.

26. The process of claim 22 further comprising adding a flocculant to the red mud-containing liquor.

* * * * *

UNITED STATES PATENT AND TRADEMARK OFFICE
CERTIFICATE OF CORRECTION

PATENT NO. : 5,711,923
DATED : January 27, 1998
INVENTOR(S) : Paul J. Harris, Robert P. Mahoney, Manian Ramesh It is certified that error appears in the above-indentified patent and that said Letters Patent is hereby corrected as shown below:

Column 15,

Claim 22, Line 22
    "alma"

Should read:

--alumina--

Signed and Sealed this

Twenty-first Day of April, 1998

Attest:

BRUCE LEHMAN

Attesting Officer      Commissioner of Patents and Trademarks